United States Patent [19]

Teramachi

[11] Patent Number: 4,644,702

[45] Date of Patent: Feb. 24, 1987

[54] SIMULTANEOUSLY GROUND TYPE BEARING BODY AND LIMITED SLIDING BEARING UNIT EMPLOYING THE SAME

[76] Inventor: Hiroshi Teramachi, 2-34-8, Higashi-Tamagawa, Tokyo, Japan

[21] Appl. No.: 765,568

[22] Filed: Aug. 14, 1985

Related U.S. Application Data

[62] Division of Ser. No. 524,585, Aug. 19, 1983, abandoned.

[30] Foreign Application Priority Data

Oct. 27, 1982 [JP] Japan ................................ 57-188869

[51] Int. Cl.$^4$ ......................... B24B 1/00; F16C 33/64
[52] U.S. Cl. ................................ 51/291; 29/148.4 R; 29/149.5 R; 384/49
[58] Field of Search ............. 308/3 R, 3 A, 6 R, 6 C; 29/148.4 A, 148.4 C, 149.5 R, 148.4 R; 51/281 R, 281 P, 290, 291, 105 SP; 384/43-45, 49, 50, 55

[56] References Cited

U.S. PATENT DOCUMENTS 2,830,409 4/1958 Northcutt ........................ 308/6 R X
3,879,897 4/1975 Kato ..................................... 51/291
4,296,974 10/1981 Teramachi ........................ 308/6 C Primary Examiner—Stuart S. Levy
Assistant Examiner—David Werner
Attorney, Agent, or Firm—Armstrong, Nikaido, Marmelstein & Kubovcik

[57] ABSTRACT

A bearing body of substantially U-shaped cross section has right and left skirts interposing therebetween a central cavity formed in its central lower part as well as opposite recesses formed in the inner peripheral side surfaces of the skirts. The bearing body further has several axial ball rolling surfaces provided on both sides of the recesses. The ball rolling surfaces are simultaneously ground in such a manner that grinding wheels having a thickness equal to the width of the recesses are brought into contact with the recesses, respectively, with a predetermined infeed angle. Also disclosed is a limited sliding bearing unit incorporating therein the above-mentioned simultaneously ground type bearing body. The bearing unit further includes a track shaft and a pair of cages.

3 Claims, 9 Drawing Figures

4,644,702

SIMULTANEOUSLY GROUND TYPE BEARING BODY AND LIMITED SLIDING BEARING UNIT EMPLOYING THE SAME

This application is a division of application Ser. No. 524,585, filed Aug. 19, 1983, now abandoned.

BACKGROUND OF THE INVENTION

The present invention relates to a simultaneously ground type bearing body suitable for use in a table saddle of a machine tool, slide surfaces in a machining center and other transfer devices which are adapted to make reciprocatory sliding motion while carrying heavy loads. The invention also pertains to a limited sliding bearing unit employing the simultaneously ground type bearing body.

In a typical conventional limited sliding bearing unit, a pair of recesses 105, 106 are formed on the right and left (as viewed in FIG. 9) of a central cavity 102 of a bearing body 101 by means of broaching. In addition, two ball rolling surfaces 107, 108 are formed on both sides of the recess 105, while two ball rolling surfaces 109, 110 are formed on both sides of the recess 106. Then, the ball rolling surfaces 107, 108, 109, 110 are hardened to produce the bearing body 101. Since the ball rolling surfaces 107, 108, 109, 110 may be distorted owing to heating in the hardening, however, the ball rolling surfaces are generally finished by means of a grinding wheel to obtain a required dimensional accuracy.

The conventional grinding for finish is such that, as shown in FIG. 9, the ball rolling surfaces 108, 110 closer to the upper sides of the right and left skirts 103, 104 are first ground successively by means of a grinding wheel G which revolves with its axis of rotation placed vertically, and then, the ball rolling surfaces 107, 109 closer to the lower sides of the right and left skirts 103, 104 are successively ground by means of a grinding wheel G which revolves with its axis of rotation placed horizontally. The prior art, however, is not suitable for mass production, since four steps are required for the grinding operation. Moreover, owing to the individual grinding for each of the four ball rolling surfaces, it is difficult to uniformly grind all the ball rolling surfaces to close tolerances. In consequence, in order to obtain required dimensions with high accuracy, an impractically long time is needed for the grinding operation, which constitutes one of factors in a high cost. If a required dimensional accuracy cannot satisfactorily be obtained, e.g., if the infeed of the grinding wheel is excessive, there will be play between the ball rolling surfaces on the bearing body and the corresponding ball rolling surfaces formed on the associated track shaft when balls are recirculated through the passageways defined by these ball rolling surfaces, resulting in various problems, such as a poor torque transmission, the generation of noise and the inclination of the bearing body. If the infeed of the grinding wheel is insufficient, on the other hand, it becomes difficult to insert balls into the space defined between the ball rolling surfaces on the bearing body and the corresponding ball rolling surfaces on the track shaft. In addition, after the insertion of the balls, the movement of the balls becomes stiff due to an increase in resistance to sliding, which makes it impossible to obtain a smooth traveling of the bearing unit disadvantageously.

SUMMARY OF THE INVENTION

Accordingly, it is an object of the invention to provide a simultaneously ground type bearing body which can be mass-produced at low cost and has ball rolling surfaces finished with high accuracy, by not only simultaneously grinding two opposite ball rolling surfaces disposed on either one of the sides of the central cavity but also simultaneously grinding a total of four ball rolling surfaces disposed on both the sides of the central cavity, thereby to solve the above-mentioned problems of the prior art.

It is another object of the invention to provide a bearing unit improved to increase its torque transmitting capacity as well as perform a noiseless, smooth traveling, by incorporating therein the above-mentioned simultaneously ground type bearing body as a constituent element thereof.

Above and other objects, features and advantages of the invention will become apparent from the following description taken in connection with the accompanying drawings.

DESCRIPTION OF THE PREFERRED EMBODIMENTS

The invention will be described hereinunder through illustrated embodiments.

Figure 1:
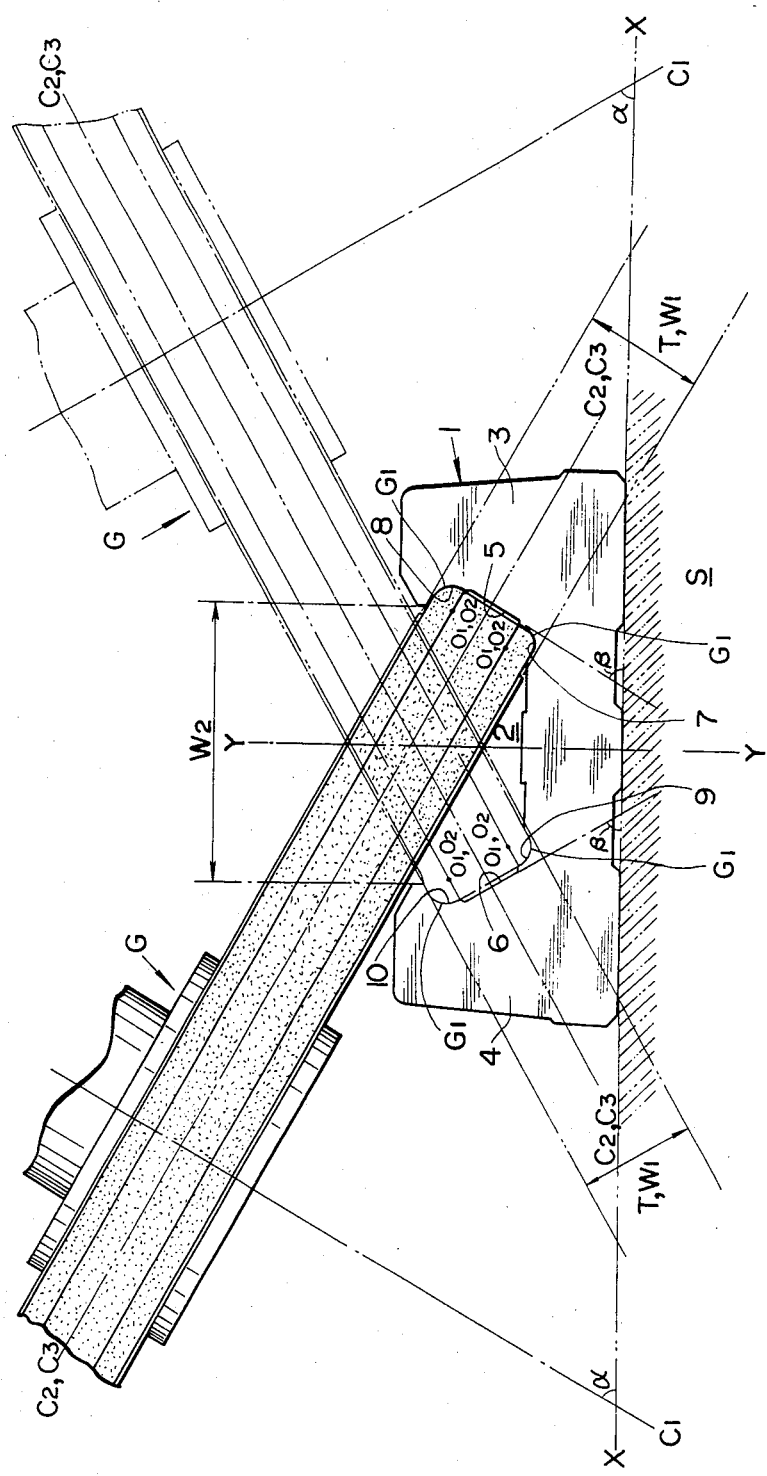
FIG. 1 illustrates how a bearing body in accordance with the invention is simultaneously ground by means of grinding wheels.
Figure 2:
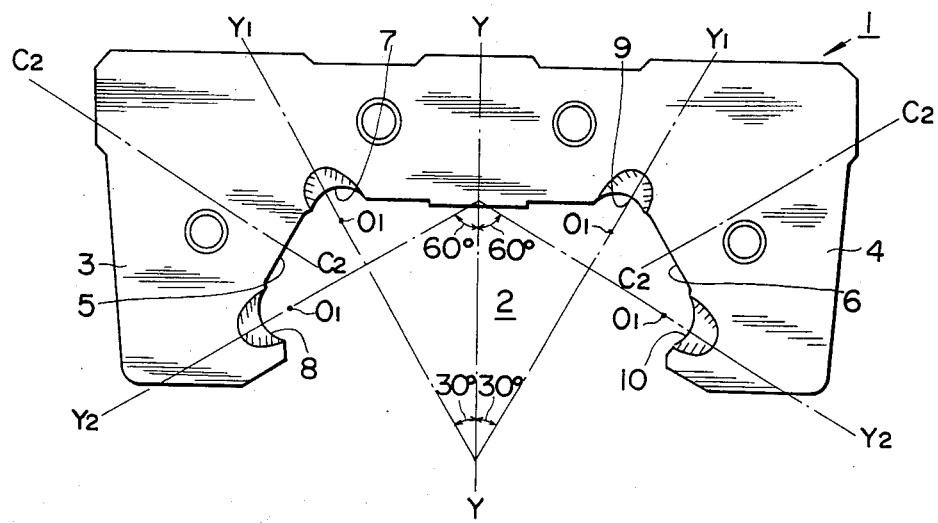
FIG. 2 is a front elevational view of the bearing body ground simultaneously in accordance with the invention.

Referring first to FIGS. 1 and 2, which in combination show a simultaneously ground type bearing body in accordance with the invention and a method of grinding the same, a reference numeral 1 denotes the whole of a bearing body, which is constituted by a block body of substantially U-shaped cross section. The bearing body 1 has a substantially rectangular central cavity 2 formed in its central lower part, as well as left and right skirts 3, 4 interposing the central cavity 2 therebetween.

Recesses 5, 6 of substantially trapezoidal cross section are formed in bilateral symmetry in the inner peripheral side surfaces of the respective skirts 3, 4. Ball rolling surfaces 7, 8, 9, 10 each having a radius of curvature substantially equal to the radius of balls are formed in both corners of the recesses 5, 6 so as to axially extend over the entire length of the bearing body 1. As clearly shown in FIG. 2, the upper ball rolling surfaces 7, 9 of these ball rolling surfaces 7, 8, 9, 10 are disposed so that the curvature center $O_1$ thereof is set on an intersecting line $Y_1$ having an angle of 30 degrees with respect to a vertical line Y—Y which passes through the center of the bearing body 1. On the other hand, the lower ball rolling surfaces 8, 10 are disposed so that the curvature center $O_1$ thereof is set on an intersecting line $Y_2$ having an angle of 60 degrees with respect to the vertical line Y—Y.

In the simultaneously ground type bearing body in accordance with the invention, the ball rolling surfaces 7, 8, 9, 10 are simultaneously ground by the following method. Namely, as shown in FIG. 1, first, the bearing body 1 is mounted on a flat machining reference surface S, with the opening side of the central cavity 2 directed upwardly. Then, a pair of grinding wheels G, G each having a thickness T as well as grinding edges $G_1$ previously dressed to have a curvature equal to that of balls are advanced into the central cavity 2 with an infeed angle $\alpha$ (about 55 to about 65 degrees), which is an angle made by each of rotational center lines $C_1$, $C_1$ thereof and a horizontal line X—X defined by the upper surface of the machining reference surface S. In this case, the grinding wheels G, G are disposed so as to be out of phase with each other in the longitudinal direction of the bearing body 1 as well as opposite in infeed direction to each other. Thus, the outer peripheral side edges of the grinding wheels G, G are fitted into the recesses 5, 6 in the left and right skirts 3, 4 to simultaneously grind two pairs of ball rolling surfaces 7, 8 and 9, 10, each pair being constituted by two opposite ball rolling surfaces formed in both corners of each of the recesses 5, 6.

In such a case, the bottom surface of each of the recesses 5, 6 has a predetermined inclination angle $\beta$ (about 55 to about 65 degrees) with respect to the horizontal line X—X, and the infeed angle $\alpha$ of each grinding wheel G is set so as to be equal to the inclination angle $\alpha$ of the bottom surface of each of the recesses 5, 6. In the illustrated embodiment, both the infeed angle $\alpha$ and the inclination angle $\beta$ are selected to be 60 degrees. Moreover, the thickness T of each grinding wheel G is made coincide with the width $W_1$ of each of the recesses 5, 6. Therefore, if the pair of grinding wheels G, G are fitted into the respective recesses 5, 6 in the opposite directions while the center lines $C_2$, $C_2$ of the respective recesses 5, 6 are made coincident with the thicknesswise center lines $C_3$, $C_3$ of the corresponding grinding wheels G, G, then the curvature center $O_1$ of each of the ball rolling surfaces 7, 8, 9, 10 and the curvature center $O_2$ of the grinding edge $G_1$ of the corresponding grinding wheel G automatically coincide with each other. Accordingly, the curvature center portion and other round portions of each of the ball rolling surfaces 7, 8, 9, 10 can be accurately machined by a simple method.

As mentioned above, in the simultaneously ground type bearing body 1 in accordance with the invention, the angle made by the bottom surface of each of the recesses 5, 6 and the horizontal line X—X, i.e., the inclination angle $\beta$ is selected to fall between about 55 and about 65 degrees. This is because, as will be clear from the figures, each grinding wheel G employed in the invention is constituted by a large grind stone having a diameter considerably larger than the diameter $W_2$ of the opening of the bearing body 1; hence, the setting of the inclination angle $\beta$ within the above-mentioned range makes it possible to prevent the grinding wheels G from interfering with the skirts 3, 4 as well as to grind each ball rolling surface with an angle most preferable for increasing the load bearing capacity of the bearing body 1 against an upward load applied thereon.

In the simultaneously ground type bearing body in accordance with the invention, as described above, the four ball rolling surfaces can simultaneously be ground simply by fitting a pair of grinding wheels made out of phase with each other into the recesses disposed on both sides of the central cavity in the opposite directions. Therefore, only one step is required to finish all the four ball rolling surfaces with a necessary dimensional accuracy, so that it becomes possible to mass-produce the bearing body, and an inexpensive product can be supplied. In addition, unlike the individual grinding, the simultaneous grinding of the ball rolling surfaces permits a constant dimensioning for the ball rolling surfaces, i.e., the ball rolling surfaces can be formed with the same curvature and the same curvature center. Therefore, the bearing body is greatly improved in dimensional accuracy compared with the prior art.

Figure 3:
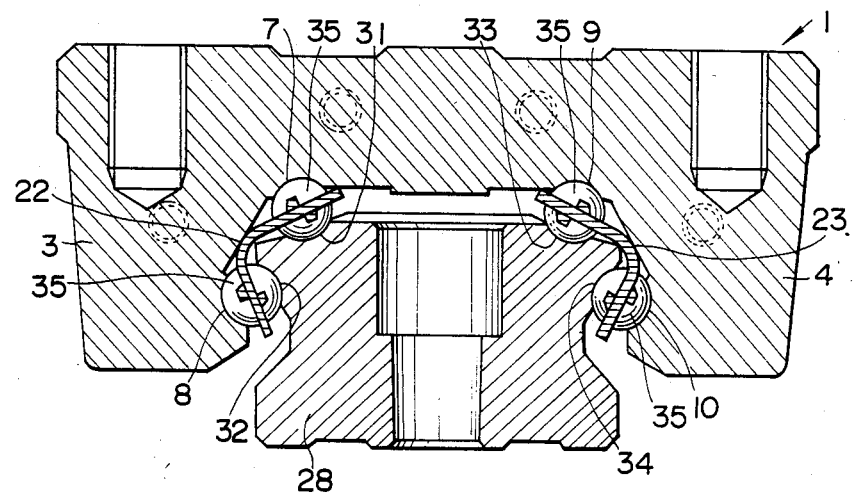
FIG. 3 is a transverse sectional view of a first embodiment of a limited sliding bearing unit in accordance with the invention incorporating therein the simultaneously ground type bearing body.
Figure 4:
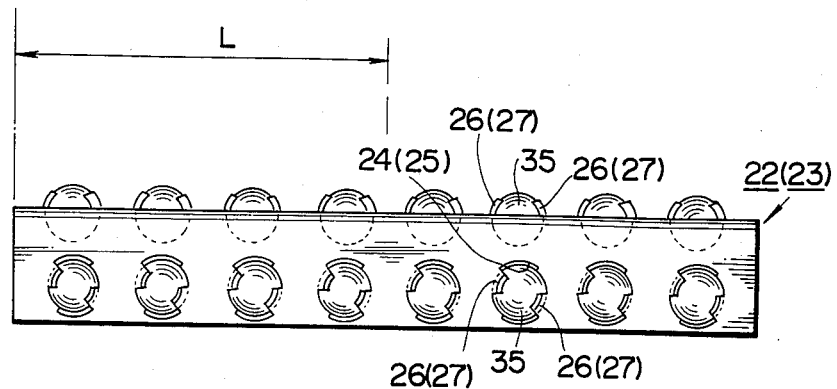
FIG. 4 is a side elevational view of a cage as a constituent element of the limited sliding bearing unit in accordance with the invention, showing the state where the cage retains load carrying balls.
Figure 5:
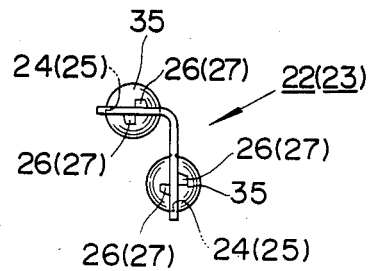
FIG. 5 is a front elevational view of the cage shown in FIG. 4.
Figure 6:
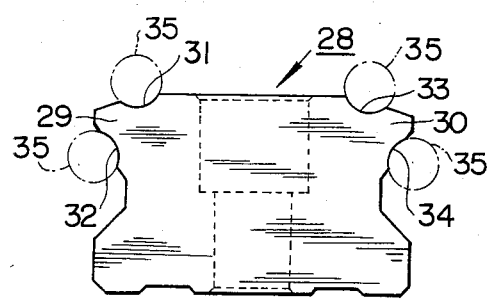
FIG. 6 is a front elevational view of a track shaft as a constituent element of the limited sliding bearing unit in accordance with the invention.
Figure 7:
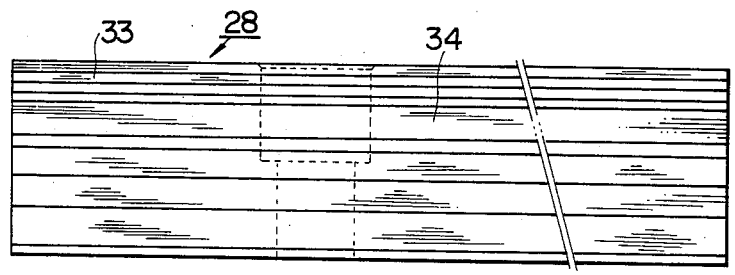
FIG. 7 is a side elevational view of the track shaft shown in FIG. 6.
Figure 8:
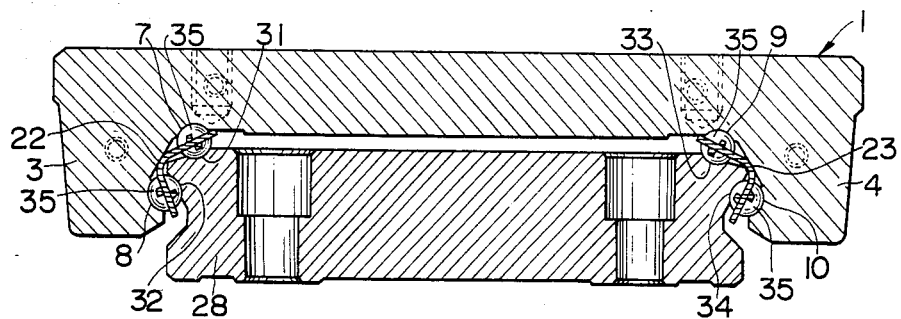
FIG. 8 is a transverse sectional front elevational view of a second embodiment of the limited sliding bearing unit in accordance with the invention.
Figure 9:
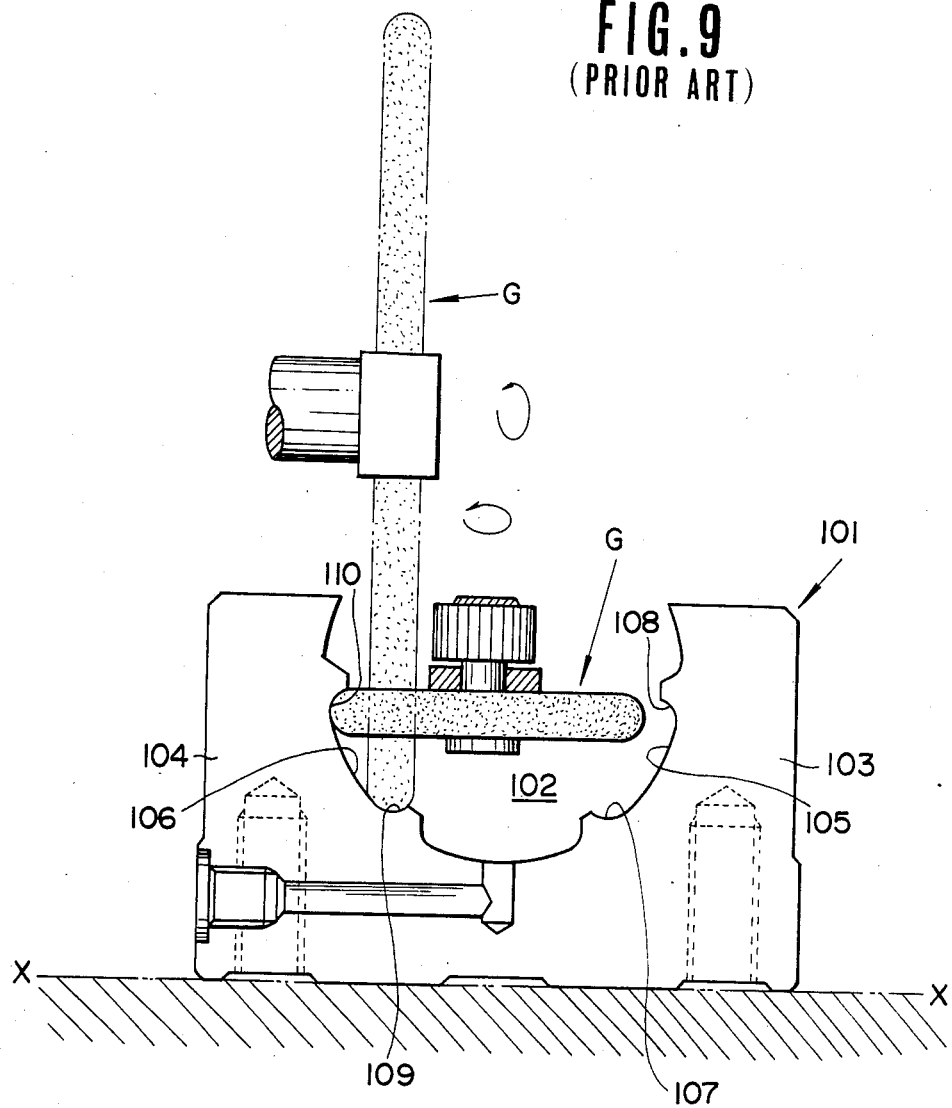
FIG. 9 illustrates how the conventional individually ground type bearing body is machined.

FIGS. 3 to 7 in combination show a first embodiment of a limited sliding bearing unit employing the above-described simultaneously ground type bearing body. Of the figures, FIG. 3 shows the construction of the whole bearing unit, while FIGS. 4 to 7 show the constructions of various components thereof. Since a reference numeral 1 in the figures denotes the bearing body as mentioned hereinbefore, various portions of the bearing body are represented by the same reference numerals as those in FIGS. 1 and 2, and the description of the construction thereof is omitted.

In the figures, reference numerals 22, 23 designate a pair of axially slidable cages fitted between the bearing body 1 and a track shaft 28, described later. The cages 22, 23 have a length substantially equal to that of the bearing body 1 and are adapted to move linearly with either one of the bearing body 1 and the track shaft 28 which is the movable part, in the same direction, but move linearly relatively to the other which is the fixed part. As clearly shown in FIGS. 4 and 5, the cages 22, 23 rollably retain load carrying balls through ball bores 24, 25 thereof, respectively, the balls being prevented from coming off by projections 26, 27.

A reference numeral 28 denotes a track shaft received by the central cavity 2 in the bearing body 1 and central cavities 17 of respective end covers. The track shaft 28 is mounted on a movable or fixed part of a machine tool or the like by employing fixing means such as bolts and the like. The track shaft 28 has axial ridges 29, 30 formed on the upper left and right sides thereof. On both sides of these ridges 29, 30, ball rolling surfaces 31, 32, 33, 34 are formed which correspond to the ball rolling surfaces 7, 8, 9, 10 formed on the bearing body 1 and have a radius of curvature substantially equal to the radius of the balls.

A reference numeral 35 designates each of load carrying balls rollably retained being received by the ball bores 24, 25 in the cages 22, 23. The load carrying balls 35 are adapted to axially move while rolling between the ball rolling surfaces 7, 8, 9, 10 on the bearing body and the ball rolling surfaces 31, 32, 33, 34 on the track shaft, being guided by the cages 22, 23.

The operation of the limited sliding bearing unit having the construction described above will be explained hereinunder.

The bearing unit in accordance with the invention is mounted on the track shaft 28 of a machining center (not shown), for instance, and a necessary instrument or device is set on the bearing body 1. Then, when the bearing body 1 is moved either forward or rearward, the load carrying balls 35 being clamped in the load carrying ball passageways defined by the ball rolling surfaces 7, 8, 9, 10 on the bearing body 1 and the corresponding ball rolling surfaces 31, 32, 33, 34 on the track shaft 28 respectively run in one direction while being guided by the cages 22, 23. In this case, the cages 22, 23 axially move with the bearing body 1 in the same direction at a speed substantially half the moving speed of the bearing body 1. Then, the cages 22, 23 stop running at a point of time when the cages 22, 23 are behind the bearing body 1, which is the movable part, by a distance corresponding to a length L substantially half the entire length of the cages or at a point of time when the cages 22, 23 have advanced on the track shaft 28, which is the fixed part, by a distance corresponding to the length L substantially half the entire length of the cages. The position where the cages stop is defined as one of the limits in the axial movement of the bearing body 1.

The limited sliding bearing unit of the invention having the construction and operation described above offers the following advantages. Namely, the bearing unit has the simultaneously ground type bearing body incorporated therein as a constituent element thereof, and moreover, the ball rolling surfaces formed on the simultaneously ground type bearing body have an extremely high dimensional accuracy. Therefore, there will be no play between the ball rolling surfaces on the bearing body and those on the track shaft. Accordingly, when the balls are moved being aligned with each other, it is possible to effect a uniform load-bearing operation by the load carrying balls, so that any abnormal wear of the ball rolling surfaces can be prevented. As a result, it is possible not only to largely increase the life of the bearing unit but also to guarantee a smooth traveling of the bearing unit over a long period of time. Moreover, since there is no play between the ball rolling surfaces, it is possible to move the bearing body without any noises while maintaining the same to be horizontal. Furthermore, since the ball rolling surfaces of the bearing body can be finished with high accuracy, when the bearing body is necessary to replace, there will hardly be dimensional errors if a new bearing body is mounted on the same track shaft. Accordingly, the bearing body in accordance with the invention is excellent in exchangeability.

Although the invention has been described through specific terms, it is to be noted here that the described embodiments are not exclusive and various changes and modifications may be imparted thereto without departing from the scope of the invention which is limited solely by the appended claims.

What is claimed is:

1. A method of manufacturing a sliding bearing unit of limited stroke including a track shaft, a bearing body of a substantially U-shaped cross section mounted on said track shaft for movement therealong through rolling balls disposed therebetween, said bearing having a central portion with right and left skirts extending therefrom and a central cavity defined between said skirts, said skirts being provided in the inner peripheral side surfaces thereof with a pair of opposing recesses, each of said recesses having at its opposite sides a pair of axially extending ball rolling surfaces and a bottom surface disposed therebetween, said bottom surface being inclined at an angle of about 55 to about 65 degrees relative to a horizontal line defined by an upper surface of a machining reference surface on which said bearing body is mounted with the opening side of said central cavity directed upward, and an axially slidable cage disposed between said track shaft and said bearing body for rollably retaining said balls at prescribed positions thereof, said method comprising:

positioning a grinding wheel, having a thickness equal to the width of each recess, onto the surface of each recess at an infeed angle equal to said angle of inclination of said bottom surface of a corresponding one of said recesses; and simultaneously grinding the pair of ball rolling surfaces at the opposite side of each recess by means of said grinding wheel.

2. A method according to claim 1, wherein four ball rolling surfaces on the right and left of said central cavity are simultaneously ground by two grinding wheels which are disposed longitudinally of said bearing body in spaced relation with each other, said grinding wheels being brought into contact with said recesses, respectively, with infeed directions opposite to each other.

3. A method according to claim 1, wherein the diameter of said grinding wheel is substantially greater than the width of said central cavity between said skirts.

* * * * *